United States Patent [19]
Andersson et al.

[11] Patent Number: 5,926,504
[45] Date of Patent: Jul. 20, 1999

[54] ELECTRICAL CIRCUIT FOR SELECTIVELY CONNECTING A REPEATER TO A DTE PORT

[75] Inventors: Ralph E. Andersson, Grass Valley; Stephen M. McConnell, Folsom, both of Calif.

[73] Assignee: Level One Communications, Inc., Sacramento, Calif.

[21] Appl. No.: 08/462,524

[22] Filed: Jun. 5, 1995

Related U.S. Application Data

[51] Int. Cl.$^6$ .............................. H04B 3/36; H04B 7/17; H04L 25/20; H04L 25/52
[52] U.S. Cl. ............................................. 375/211; 326/38
[58] Field of Search ..................... 375/211, 212, 375/213; 379/338; 455/7; 326/38; 370/489, 476, 492

[56] References Cited

U.S. PATENT DOCUMENTS

| | | |
|---|---|---|
| 4,539,531 | 9/1985 | Thomas et al. . |
| 4,560,985 | 12/1985 | Strecker et al. . |
| 4,564,934 | 1/1986 | Macchi . |
| 4,833,422 | 5/1989 | Atwell . |
| 4,902,917 | 2/1990 | Simpson ................................. 307/465 |
| 4,907,225 | 3/1990 | Gulick et al. . |
| 4,928,102 | 5/1990 | Katzenstein . |
| 4,941,156 | 7/1990 | Stern et al. . |
| 5,051,622 | 9/1991 | Pleva ....................................... 307/465 |
| 5,113,093 | 5/1992 | Tashiro et al. .......................... 307/465 |
| 5,210,749 | 5/1993 | Firoozmand . |
| 5,237,218 | 8/1993 | Josephson et al. ..................... 307/465 |
| 5,249,183 | 9/1993 | Wong et al. ............................ 370/85.3 |
| 5,265,124 | 11/1993 | Staab et al. ............................. 375/213 |
| 5,299,195 | 3/1994 | Shah ........................................ 370/85.6 |
| 5,568,515 | 10/1996 | Wincn ..................................... 375/257 |
| 5,608,341 | 3/1997 | Andersson .............................. 326/38 |

OTHER PUBLICATIONS

At&T Microelectronics, T7202 Smart Hub Controller (SHC), Preliminary Data Sheet, Sep. 1992.
Level One, HDSL Data Pump Chip Set, Advance Information, Dec. 1993.
Level One, LXT901 Universal Ethernet Interface Transceiver, Advance Information Standard Product, Feb. 1991.
Level One LXT903 10Base–T Hub Transceiver, Preliminary Information Standard Product, Aug. 1990.
Micro Linear, ML4653 10Base–Transceiver for Multi–Port Repeaters, Advance Information, Sep. 1989.

*Primary Examiner*—Chi H. Pham
*Assistant Examiner*—Bryan Webster
*Attorney, Agent, or Firm*—Merchant & Gould P.C.

[57] ABSTRACT

A communications inter-repeater circuit that includes an Attachment Unit Interface (AUI) port which can be selectively switched between a Media Attachment Unit (MAU) mode and a Data Terminal Equipment (DTE) mode. This selective change in the AUI allows for direct connection of Data Terminal Equipment (DTE) to the repeater without requiring a separate MAU. The determination of the mode for the AUI port is made by a selector. The selector may be a configuration sense pin whereon a selection potential is applied during reset of the repeater functions.

19 Claims, 5 Drawing Sheets

FIG. 4

| APPLICATION | 100 PIN PKG. PIN 30 | 68 & 100 PIN PKGS. LEDJM PIN | AUI SEX | LED APPLICATION |
|---|---|---|---|---|
| 1 | 0 | 0 | DTE | DEFAULT, 1-3 |
| 2 | 0 | 1 | MAU | 1-3 |
| 3 | 1 | 0 | MAU | DEFAULT, 1-3 |
| 4 | 1 | 1 | MAU | 1-3 |

ELECTRICAL CIRCUIT FOR SELECTIVELY CONNECTING A REPEATER TO A DTE PORT

CROSS-REFERENCE TO RELATED APPLICATIONS

This application is related to:

Application Ser. No. 08/379,903, entitled "Inter-Repeater Backplane with Mixed Signal State Machine Interconnect," filed on Jan. 30, 1995 by Ralph E. Andersson et al, and assigned to the assignee of this application;

Application Ser. No. 08/379,907, entitled "Inter-Repeater Backplane With Synchronous/Asynchronous Dual Mode Operation," filed on Jan. 30, 1995 by Ralph E. Andersson et al., and assigned to the assignee of this application;

Application Ser. No. 08/380,651, entitled "Inter-Repeater Backplane," filed on Jan. 1, 1995 by David T. Chan et al., and assigned to the assignee of this application;

Application Ser. No. 08/380,074, entitled "Inter-Repeater Backplane For Allowing Hot-Swapping Of Individual Repeater Circuits," filed on Jan. 30, 1995 by David T. Chan et al., and assigned to the assignee of this application; and Application Ser. No. 08/437,621, entitled "Electrical Circuit For Setting Internal Chip Functions Without Dedicated Configuration Pins," filed on May 9, 1995 by Ralph E. Andersson, and assigned to the assignee of this application.

All of the above-identified applications are incorporated by reference herein.

BACKGROUND OF THE INVENTION

1. Field of the Invention.

This invention relates in general to an Attachment Unit Interface (AUI), and more specifically to an Attachment Unit Interface (AUI) which may be selectively switched between a Media Attachment Unit (MAU) mode and a Data Terminal Equipment (DTE) mode.

2. Description of Related Art.

The communications industry has experienced phenomenal growth over the past several years. Much of this growth has occurred in the area of data communications involving computers and computer generated or stored data. The exchange of messages and data has been facilitated by the advent of local and metropolitan area networks. Remotely located computer users communicate over the local and metropolitan area networks to access data and to communicate with other remote computer users.

This phenomenal growth has led to new integrated circuits to support data communication applications. Nevertheless, in the marketing of highly-integrated, application-specific integrated circuits, targeting the needs of all customers is becoming increasingly difficult. To successfully sell a product in today's competitive marketplace, a chip manufacturer must create a distinct "feel" to their product through its form and function.

One way of creating a distinct "feel" to a chip is to design in flexibility. An integrated circuit manufacturer can attempt to anticipate all of the demands of its customers by designing multiple modes of operation into their chip. These modes are usually selected through configuration pins which are dedicated to mode selection. Thus, some pins may be used for mode selection during normal operation of the chip. For highly integrated designs, the pins of a device are usually all used; there are very few which are unconnected. Pins are used as functional inputs and outputs during normal operations. Further, since there are only a limited number of pins on a given package, they come at a premium. It is sometimes hard to give up a pin for defining configurations. Hence it is desirable to be able to configure a device's operation without having to sacrifice a pin which could otherwise be used as a functional input or output.

In network applications, nodes may be connected to a bus and have multiple, or concurrent, access to the communications medium. Control techniques are used to allow access to the communication medium and to resolve contention between the various users. Typically, a carrier sense, multiple access with collision detection (CSMA/CD) scheme is used. With CSMA/CD a node listens for activity and begins sending message packets when the node determines that no activity is occurring over the network. Sometimes simultaneous transmission by multiple nodes occurs. This results in collisions between the different message packets. When a node detects a collision, a signal is sent over the network to the other transmitting nodes. The affected nodes terminate their transmissions and probabilistically reschedule their next attempt to transmit.

The standard for Local and Metropolitan Area Network technologies is governed by ISO/IEEE 8802.3-1994. ISO/IEEE 8802.3-1994 describes the relationship among the family of 802 standards and their relationship to the ISO Open System Interconnection Basic Reference Model and is herein incorporated by reference. ISO/IEEE 8802.3-1994 defines the standards for a bus utilizing collision sense multiple access/collision detection (CSMA/CD) as a data link access method and is herein also incorporated by reference.

Typically, unshielded twisted pair cables or existing telephone wiring is used as the transmission medium to provide an economical solution to networking. However, the quality of the signals transmitted over unshielded twisted pair cables degradates as the distance between data terminal equipment becomes greater. Thus, repeaters are used to facilitate greater distances and to improve signal quality.

In the past, repeaters were limited to a fixed number of ports thereby limiting the number of data channels. Accordingly, repeater manufacturers designed hardware which could be cascaded so that multiple repeater circuits could be integrated into a single hub.

FIG. 1 illustrates the physical layer partitioning relationship 10 for interconnecting a repeater to a data source such as an Ethernet adapter on a personal computer or to another repeater. The physical layer contains the AUI interface 12. The AUI interface is a non-specific media interface. From the AUI interface, repeaters traditionally have internal MAUs 14 which allow them to connect to specific types of media such as twisted pair (i.e., 10Base-T).

Nevertheless, in all prior implementations of the AUI interface, the interface is exclusively that of a DTE. Interconnection to the transmission media are made via an external MAU through the AUI port. This approach is embodied in the original concept of the AUI interface as defined in the ISO/IEEE 8802.3-1994 standard referenced above.

This approach provides the end user flexibility since the type of media used for a Local Area Network (LAN) can be made independently of the underlying adapters and repeaters used in the LAN. While repeaters contain internal MAUs which are used to connect to specific types of media, AUI ports provide a medium non-specific interface to MAUs. MAUs may be purchased to connect to a type of media not addressed by the repeaters internal MAUs. To connect a repeater to the DTE port of a data source such as an Ethernet adapter card used on a personal computer or inter-repeater involves the connection of a DTE port to a DTE port.

FIG. 2 illustrates a repeater 20 having an AUI interface 24 and four twisted-pair ports 70. However, a generic data source having a DTE port cannot be connected directly to the repeater AUI interface implementing as a DTE port. External MAUs must be attached to both DTE ports with some medium type connecting the two MAUs. Alternatively, a DTE port of a data source may be connected to a twisted-pair MAU. The twisted-pair MAU may in turn be connected to one of the twisted-pair ports of the repeater. This configuration may be reversed if the data source includes a twisted-pair port. Further, if the data source includes a twisted-pair port, a third alternative connection may be implemented by directly connecting the twisted-pair port of the data source to one of the twisted-pair ports of the repeater.

Accordingly, the third alternative connection is the least expensive since an external MAU is not required. However, this is often the least desirable configuration since twisted pair ports are used, for a variety of reasons, much more often than the AUI ports.

It can therefore be seen that there is a need to change the mode of the AUI port from a DTE mode to a DCE or MAU mode. However, the DTE functions of the AUI cannot be eliminated.

It can therefore be seen that there is a need to provide a system for operating with a number of selectable modes of operation and yet be efficient from a logic and circuitry perspective.

It can also be seen that there is a need for an inter-repeater having an AUI port with selectable functionality.

It can also be seen that there is a need for an inter-repeater with an AUI port that can be selectively changed by the user to be an MAU port.

It can also be seen that there is a need to select between the MAU and DTE modes of operation for an AUI port via a single control signal, which may be accessible by any means including, but not limited to external sense pins or internal registers.

SUMMARY OF THE INVENTION

To overcome the limitations in the prior art described above, and to overcome other limitations that will become apparent upon reading and understanding the present specification, the present invention discloses a system wherein multiple configurations of an integrated circuit's operation are controlled. More specifically, the present invention discloses an inter-repeater circuit that can be selectively connected to a Data Terminal Equipment (DTE) port by changing an AUI port of the repeater.

The present invention solves the above-described problems by providing a convertible AUI using a single control signal to switch between DTE version of the AUI and the MAU version of the AUI.

A system in accordance with the principles of the present invention comprises a means for sensing a potential detected at a pin and an attachment unit interface (AUI) port, coupled to the sensing means. The attachment unit interface is selectively switched between a media attachment unit (MAU) mode and a data terminal equipment (DTE) mode.

One aspect of the present invention is that the AUI may be selected to a MAU version when used with traditional Ethernet adapter cards, thereby allowing the AUI to be directly connected to the adapter.

Another aspect of the present invention is that by providing for the selection of the MAU version of the AUI on a repeater, a Media Access Controller for facilitating remote management may be connected directly to the repeater rather than being designed into the repeater itself.

Another aspect of the invention is that a twelve (12) port repeater may be implemented by configuring one repeater with a MAU version of the AUI and two other repeaters configured as DTE.

Yet another aspect of the invention is that several repeaters can be interconnected via MAU to DTE AUI connections without losing any of the available twisted pair ports, while still providing a customary DTE AUI port.

Still another aspect of the invention is that the sensing means is operative following a reset to determine the selection of the attachment unit interface port mode by a user.

Still another aspect of the invention is that it may be implemented on a repeater having a 68 pin or a 100 pin quad flat pack configuration.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 4 is a chart illustrating the AUI mode associated with specific sense pin logic and LED application selections;

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
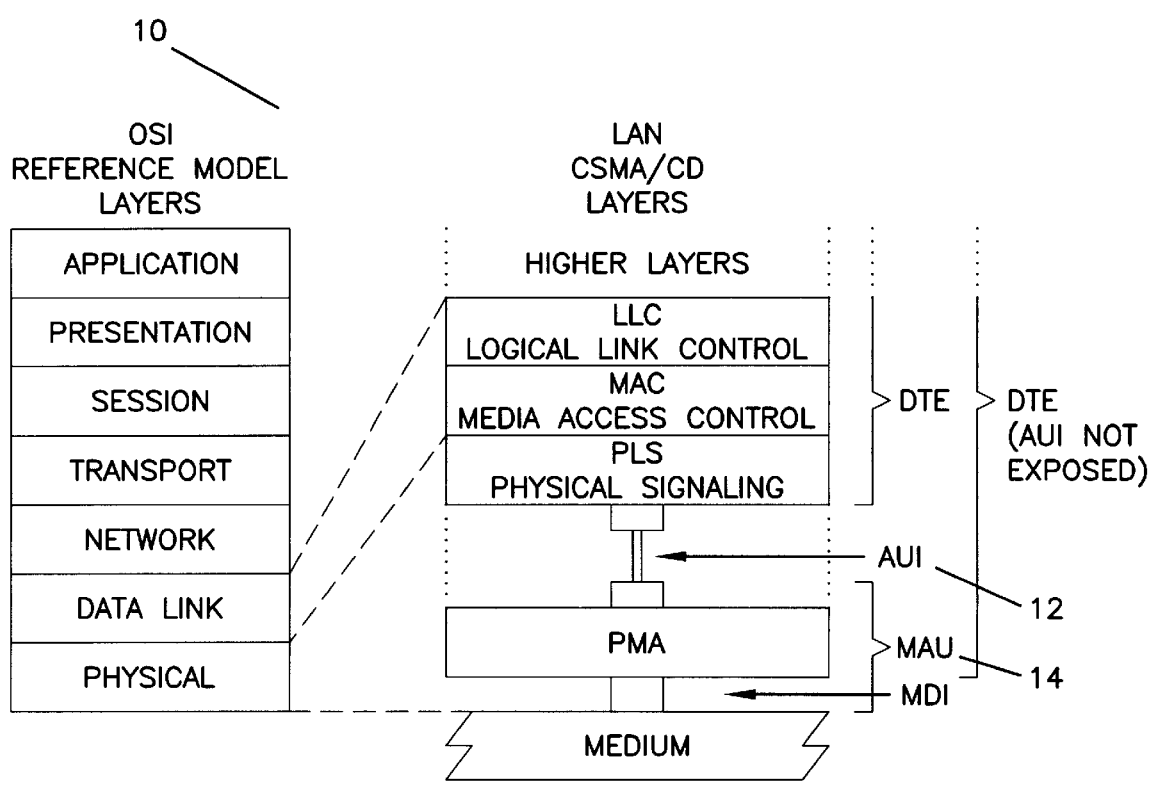
FIG. 1 illustrates the physical layer partitioning relationship for interconnecting a repeater to a data source.
Figure 2:
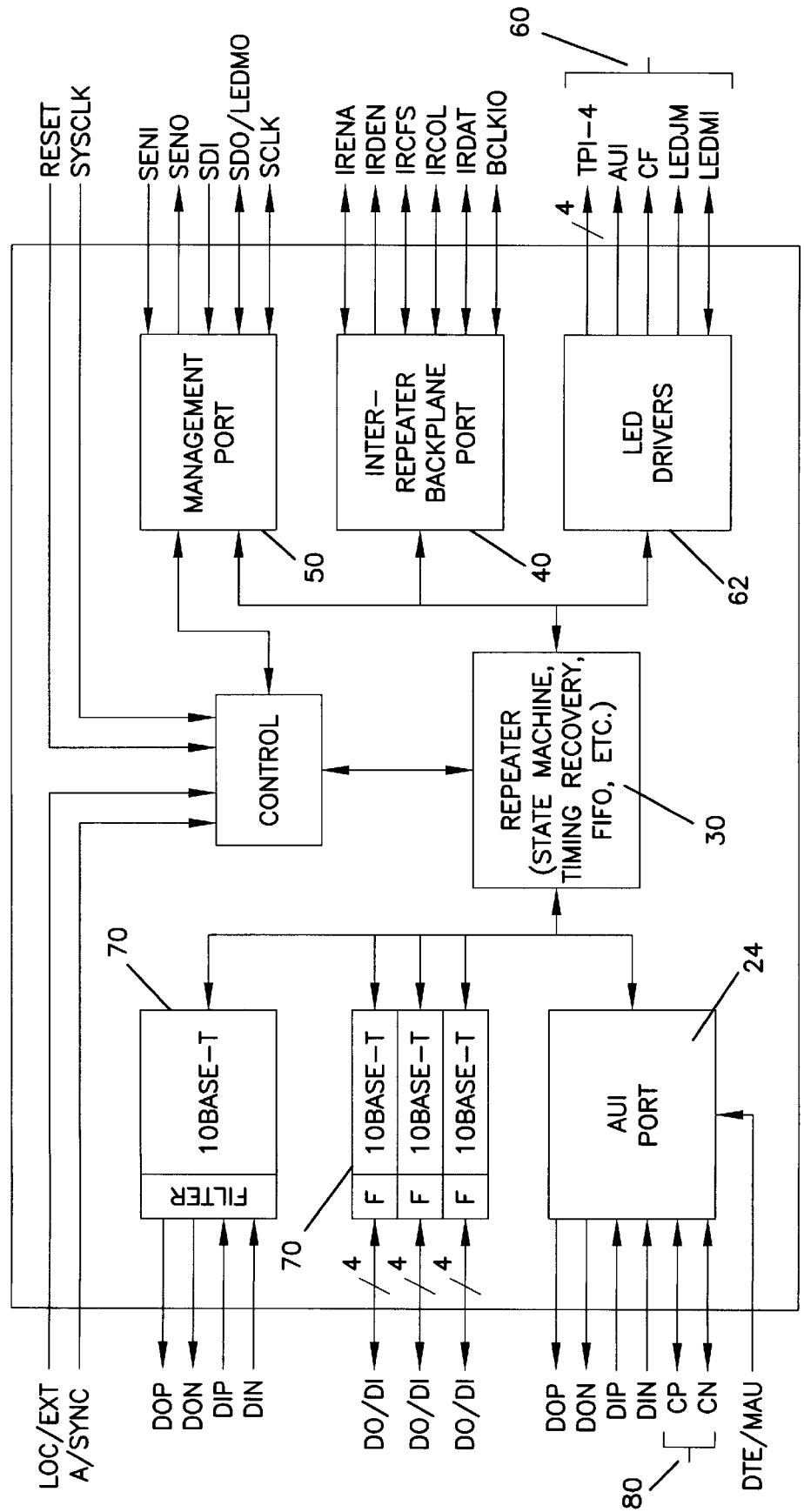
FIG. 2 is a system block diagram of a repeater having a selectable AUI port according to the invention.

For a better understanding of the present invention, FIG. 2 illustrates an exemplary integrated hub repeater 20 for 10Base-T networks incorporating a selectable AUI port 24 using application sense functions according to the present invention. Typically, repeaters include a control portion 30 including the global repeater state machine, timers and counters, and a timing recovery circuit.

According to the present invention, a repeater is connected to an inter-repeater backplane by way of an inter-repeater backplane interface 40. The inter-repeater backplane interface 40 facilitates the interconnection of a large number of 10Base-T ports ($\geq$128) into an integrated single repeater hub. Additionally, there is a serial port 50 for providing information for network management and to gather statistics by an external management device or software. Further, LED drivers 60 are provided as an integrated unit in the LED driver section 62. Thus, LEDs may be connected to the repeater unit 20 to indicate status of the repeater and may be driven by the LED driver section 62.

The repeater also includes an Attachment Unit Interface (AUI) 24 and four 10-base T receivers 70. The transceivers 70 are self-contained and require no external filters. Typically, AUI ports 24 are utilized to connect a repeater to other external transceivers (e.g., 10Base-2, 10Base-5, 10Base-T, or FOIRL) or to drop cables. According to the present invention, the AUI interface 24 can be selectively changed from a Data Terminal Equipment (DTE) mode to an Media Attachment Unit (MAU) mode. The AUI interface port may be switched between the MAU and DTE modes of operation for an AUI port via a single control signal, which may be accessible by any means including, but not limited to, external sense pins or internal registers. This selector allows for direct connection of a DTE port of a personal computer to the inter-repeater without requiring a separate MAU. In the DTE mode, the repeater may be connected via the AUI port 24 to other external transceivers or to a drop cable. In the MAU mode, the AUI port 24 creates a MAU output compliant with section 7 of ISO/IEEE 8802.3-1994 thereby allowing direct connection to another DTE interface.

Thus, the repeater according to the invention is capable of providing either the DTE or the MAU version of the AUI. In the DTE mode, the Collision ports (CP, CN) 80 to the AUI port 24 act as inputs. In the MAU mode, the Collision ports 80 to the AUI port 24 act as outputs.

According to the preferred embodiment of the invention, the AUI application is selected following reset and the operation of the circuit is accordingly altered before any signals appear at the output of the device as described in application Ser. No. 08/437,576, entitled "Multiple Display Blink Scheme For Integrated Circuit With Application Sense," filed May 9, 1995, herein incorporated by reference.

Figure 3:
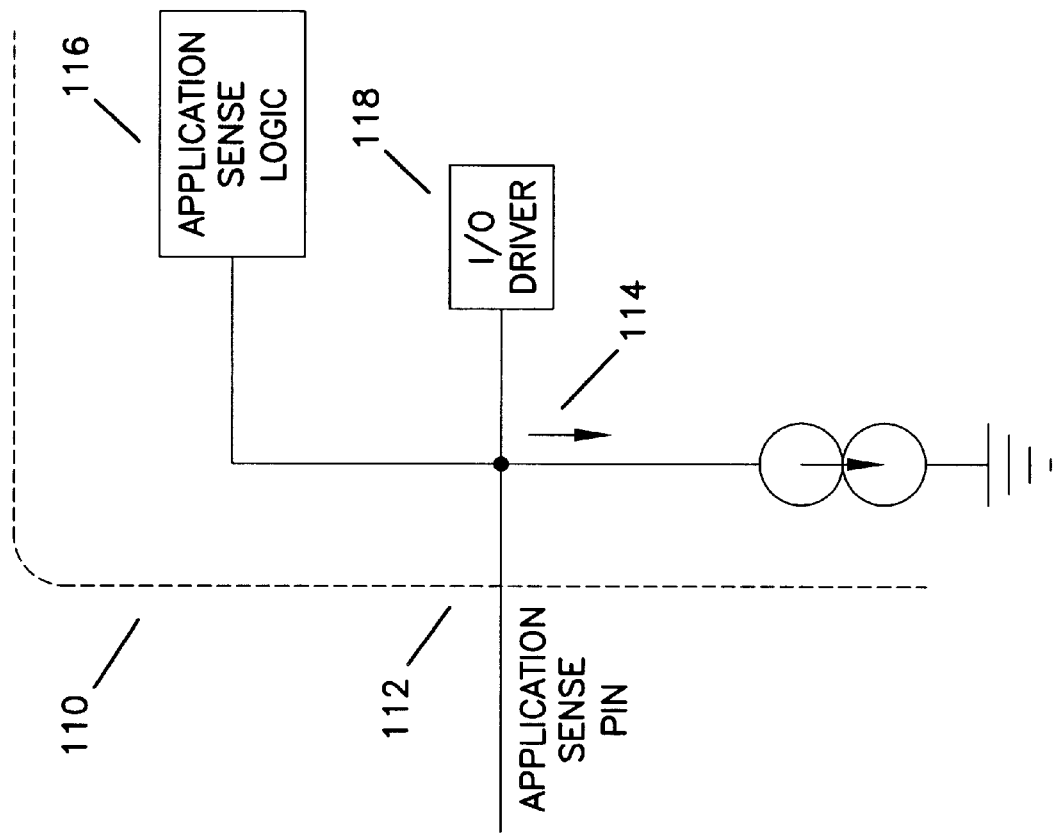
FIG. 3 is a circuit block diagram for the AUI application select functions of the invention.

FIG. 3 illustrates a circuit block diagram for the AUI application select functions of the invention. An internal weak pulldown in the chip sinks current of approximately 40 uA on an application sense pin 112 during the portion of time when a reset is being implemented on the chip. If the application sense pin 112 functions as an output during non-sense periods, the output driver 118 is tristated (disabled) during the portion of time when the external configuration is being sensed. If the sense pin 112 is used as an input, no changes are made to the internal input function during the portion of time when the external configuration is being sensed. Thus, an application sense pin 112 may be used to sense whether a primary application or a secondary/alternate application is desired. Further, the application sense pin may be used to change the application for a pin from an unassociated function to a function selected by external components.

Referring to FIG. 3, the application sense pin 112, detects the logic level thereon. When the sense pin 112 is left unconnected, the internal pulldown 114 is sufficient to result in a low logic level during the application sense period. The pulldown is enabled during reset and the output is disabled. The pulldown is sufficient to pull the application sense pin down to a logic low which is sensed by the application select logic 116 as described in application Ser. No. 08/437,621, entitled "Electrical Circuit For Setting Internal Chip Functions Without Dedicated Configuration Pins," which was incorporated by reference above. Alternatively, a logic high level may be imposed upon the application sense pin 112 to select the second application.

In a first preferred embodiment, the repeater chip is a 68 pin (PLCC). In a second preferred embodiment, the repeater chip is a 100 pin quad flat pack (QFP). In both of the preferred embodiments, the repeater also provides four multiple blink schemes for the LED outputs as described in application Ser. No. 08/437,576, entitled "Multiple Display Blink Scheme For Integrated Circuit With Application Sense," which was incorporated by reference above. FIG. 4 is a chart 300 illustrating the AUI mode or sex 310 which is associated with specific sense pin logic 320, 330 and LED application selections 340. In both the 68 pin PLCC and the 100 pin QFP, the AUI application selection is available. However, in the 68 pin QFP, the AUI interface may not be changed from the DTE mode to the MAU mode if the default blink scheme is also selected. This is because the 68 pin PLCC uses the LEDJM pin 320 to select the AUI application, thereby affecting the three level biasing of the pin. Nevertheless, for LED applications 1–3, the LEDJM pin is not used.

In contrast, the 100 pin QFP may use the LEDJM pin 320 for AUI application selection while LED applications 1–3 are desired. However, a dedicated pin 330 is provided on the 100 pin QFP for selection of the MAU mode. Thus, all four LED applications are available for use. However, it is to be understood that these preferred embodiments are presented for illustration only and are not meant to limit the invention. Those skilled in the art will recognize that other embodiments incorporating the teaching of the present invention are possible without departing from the invention. For example, the repeater may implement the selectable AUI without providing for multiple blink schemes. Further, the repeater may be designed with dedicated sense pins or alternative pins may be used for AUI application selections.

Figure 5:
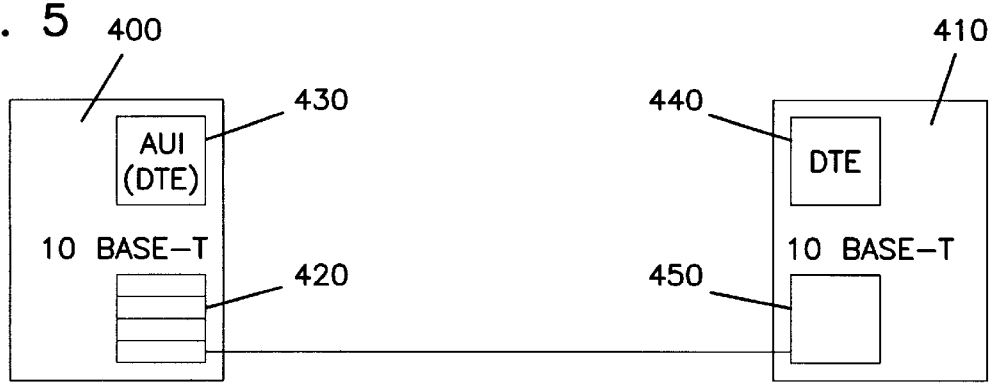
FIG. 5 illustrates a repeater according to the present invention connected to an Ethernet adapter card using 10Base-T ports.

The selective AUI application has benefits for repeaters such as the LXT914 5-port repeater manufactured by Level One Communications, Inc. of Sacramento, Calif. FIG. 5 illustrates a repeater 400 according to the present invention connected to an Ethernet adapter card 410 using 10Base-T ports. As described with reference to FIG. 2, the LXT914 has four 10Base-T ports 420 and one AUI port 430. In contrast, most Ethernet adapters 410 have a DTE port 440 and a 10Base-T port 450. By using the AUI port 430 to connect the LXT914 repeater rather than the 10Base-T 420, a user can free up one of the LXT914 10Base-T ports 420. However, a user cannot directly connect the LXT914's AUI port 430 while in the DTE mode to an Ethernet adapter's DTE 440 or 10Base-T port 450 without two and one MAU respectively.

The selectability of the AUI port of the repeater provides flexibility by allowing multiple configurations. A repeater according to the invention with the DTE mode selected for the AUI port may be connected to an Ethernet card using three different configurations. FIG. 5 illustrates the first configuration exemplifying the situation where the user chooses not to purchase an MAU. In this configuration, two of the repeater's five ports may be used. The AUI port 430 is left unconnected because the 10Base-T port 420 is used instead. However, the user has only three 10Base-T ports 420 left in such a configuration.

Figure 6:
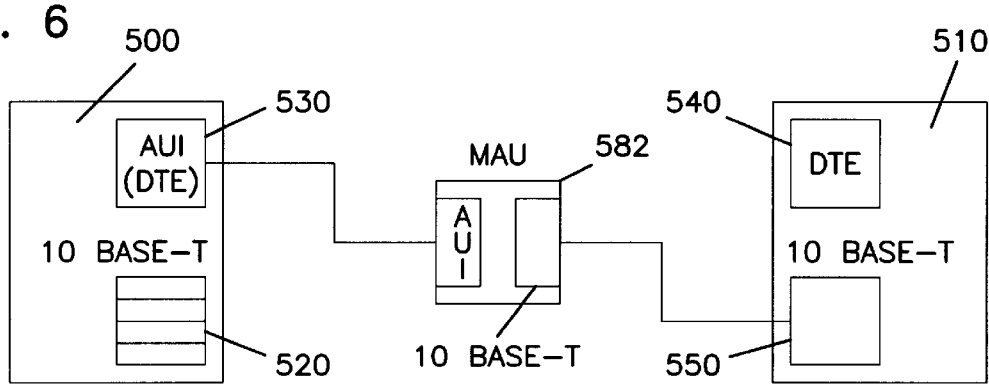
FIG. 6 illustrates a second configuration wherein a repeater is connected to an Ethernet adapter card using a single MAU.

FIG. 6 illustrates a second configuration wherein a repeater 500 is connected to an Ethernet adapter card 510 using a single MAU 582. If the user purchases one MAU, one port may be used by connecting the AUI port 530 to a MAU. Accordingly, four 10Base-T ports 520 remain available.

Figure 7:
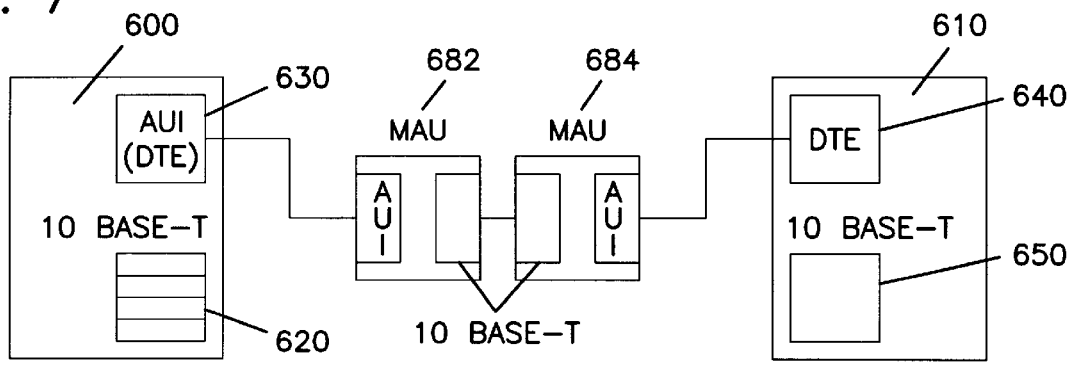
FIG. 7 illustrates a third configuration wherein a repeater is connected to an Ethernet card's DTE port using two MAUs.

FIG. 7 illustrates a third configuration wherein a repeater 600 is connected to an Ethernet card's DTE port 640 using two MAUs 682, 684. The user again has four 10Base-T ports 620 which remain available in such a configuration.

Figure 8:
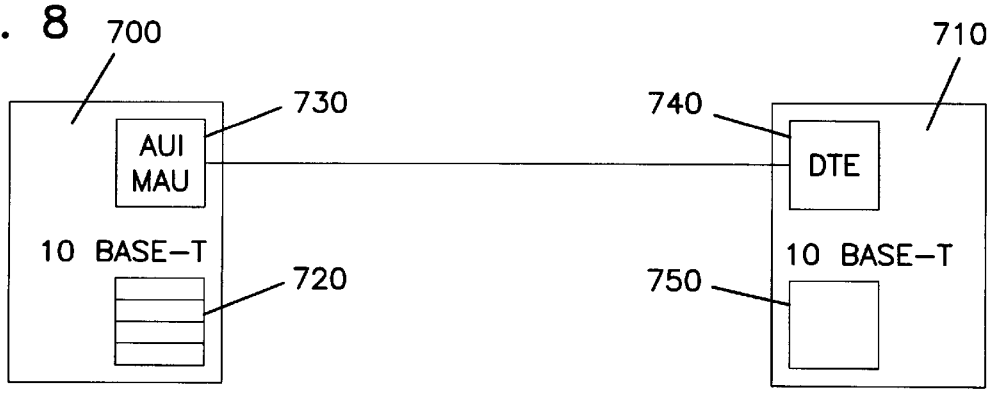
FIG. 8 illustrates the configuration where the mode of the AUI port is changed from the DTE mode to the MAU mode.

Finally, FIG. 8 illustrates the configuration where the mode of the AUI port may be changed from the DTE mode to the MAU mode. The change in the AUI port 720 of the repeater to the MAU mode allows the user to connect such a repeater to a DTE port 740 without having to purchase an MAU and still leaves four 10Base-T ports 720 available after the connection. In this configuration, multiple DTEs 740 may be connected to the repeater AUI port 730. In addition, remote management is commonly required of repeaters. However, in order to gain the information necessary to implement most management features, a Media Access Controller (MAC) must be present in the repeater design. Since all MACs implement the DTE version of the AUI, additional hardware is normally required. However, the repeater according to the present invention allows the direct connection of a MAC to the repeater by selecting the MAU mode for the AUI.

This selective connection is financially advantageous to the user. A maximum number of ports for the same cost are available as if the user had to purchase an MAU to connect the repeater to an Ethernet adapter.

The foregoing description of the preferred embodiment of the invention has been presented for purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A circuit for providing an attachment unit interface (AUI) port with selectable functionality, comprising:
   an attachment unit interface (AUI) port, the attachment unit interface being selectively switched between a media attachment unit (MAU) mode and a data terminal equipment (DTE) mode; and
   a selector, coupled to the AUI port, for selecting the mode of the AUI.

2. The circuit of claim 1 wherein the selector comprises a sense pin for sensing a potential applied thereto.

3. The circuit of claim 1 wherein the AUI port substantially complies with protocols set forth by ISO/IEEE 8802.3-1994.

4. The circuit of claim 1 wherein the selector is operative following a reset to determine the selection of the attachment unit interface port mode by a user.

5. The circuit of claim 1 wherein the AUI port is selected to a MAU mode, the AUI port in the MAU mode being capable of direct connection to an Ethernet adapter card.

6. The circuit of claim 1 wherein the AUI port is implemented on a repeater and wherein the selection of the MAU mode of the AUI port allows connection of a Media Access Controller to the repeater.

7. The circuit of claim 1 wherein mode of the AUI port is selected following a reset condition.

8. A repeater having an attachment unit interface (AUI) port with selectable functionality, comprising:
   an attachment unit interface (AUI) port, the AUI port being selectively switched between a media attachment unit (MAU) mode and a data terminal equipment (DTE) mode;
   a selector for selecting the mode of the AUI port; and
   a repeater state machine, coupled to the selector and the AUI port for determining the mode of the AUI port in response to a signal provided by the selector.

9. The circuit of claim 8 wherein the selector comprises a sense pin for sensing a potential applied thereto.

10. The repeater of claim 6 wherein the repeater is a 68 pin (PLCC).

11. The repeater of claim 9 wherein the repeater further comprises LED outputs.

12. The repeater of claim 11 wherein the repeater further comprises means for providing multiple blink schemes for the LED outputs.

13. The repeater of claim 12 wherein at least one of the blink schemes uses the AUI port mode selection pin, the use of the mode selection pin preventing the selection of the MAU mode for the AUI port.

14. The repeater of claim 8 wherein the repeater is a 100 pin quad flat pack.

15. The repeater of claim 11 wherein the repeater further comprises means for providing multiple blink schemes for the LED outputs.

16. The repeater of claim 14 further comprising a dedicated pin for selection of the AUI port mode.

17. The repeater of claim 8 further comprising four 10Base-T ports, the mode of the AUI port being changed from the DTE mode to the MAU mode, the change in the AUI port of the repeater to the MAU mode allowing the user to connect a repeater directly to a DTE port without using the four 10Base-T ports.

18. The repeater of claim 17 wherein multiple data terminal equipment are connected to the AUI port.

19. A method for selecting the functionality of an attachment unit interface (AUI), comprising the steps of:
   providing a repeater circuit having an attachment unit interface (AUI) port, the AUI port being selectively switchable between a media attachment unit (MAU) mode and a data terminal equipment (DTE) mode;
   sensing a potential at a device pin for determining the mode for the AUI port; and
   selectively switching the mode of the AUI port in response to the potential detected at the pin.

* * * * *